T. H. PATE.
Thill-Coupling.
No. 199,662. Patented Jan. 29, 1878.
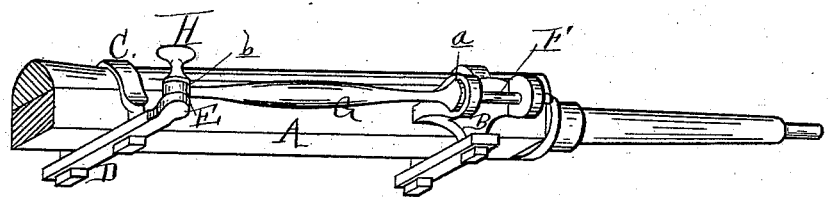
Attest:
H. L. Aulls
Chas J. Hunt
Inventor:
T. H. Pate
By Atty
Thos. S. Sprague

UNITED STATES PATENT OFFICE.

THEODORE H. PATE, OF WAYNE, MICHIGAN, ASSIGNOR OF ONE-HALF HIS RIGHT TO HAMILTON BALUS AND Z. SMITH KNICKERBOCKER, OF SAME PLACE.

IMPROVEMENT IN THILL-COUPLINGS.

Specification forming part of Letters Patent No. 199,662, dated January 29, 1878; application filed December 31, 1877.

*To all whom it may concern:*

Be it known that I, THEODORE H. PATE, of Wayne, in the county of Wayne and State of Michigan, have invented an Improvement in Shaft-Couplings, of which the following is a specification:

The nature of my invention relates to certain new and useful improvements in shaft-couplings for vehicles, by means of which the changing of the shafts for a pole is rendered very easy. By the ordinary bolt in common use, it very frequently happens that in turning the nut to remove the bolt, the latter turns with the nut, requiring, in order to remove the nut, that the bolt be prevented from turning by the use of a second wrench, or some other equivalent device. It also is common to partially remove the wheel from the arm, in order to withdraw the bolt after the removal of the nut.

The object of my invention is to do away with these difficulties; and the invention consists in the construction and arrangement of the various parts, as more fully hereinafter set forth.

The figure is a perspective view, showing the clip, bolt, and bar, and securing device, as secured to an axle.

In the drawings, A represents a section of a wagon-axle, to which is secured, in the usual manner, the shaft-clip B in common use. C is also a clip, in common use, for securing the two parts of woods and iron which form the axle together. To this clip C, I attach the washer-bar D, prolonged to the front, as shown, and terminating in an upwardly-projecting hollow stud, E.

A bolt, F, is provided to engage with the clip B, as shown, and this bolt is provided with a flanged shoulder, $a$, to act as a stop against the side of the clip. This bolt is prolonged by the arm G, the end of which terminates in an eye, $b$, which rests upon the upper end of the stud E; and a thumb-screw, H, passes through this eye and engages with the interior of the stud, which is threaded for that purpose.

What I claim as my invention, and desire to secure by Letters Patent, is—

In combination with the shaft-clip B and clip C, the washer-bar D, provided with the hollow and threaded stud E, the bolt F, provided with the arm G, constructed as described, and the thumb-screw H, arranged to operate substantially as and for the purposes specified.

THEODORE H. PATE.

Witnesses:
H. S. SPRAGUE,
CHAS. J. HUNT.